US006811917B2

(12) United States Patent
Fitts et al.

(10) Patent No.: US 6,811,917 B2
(45) Date of Patent: Nov. 2, 2004

(54) THERMOSETTING COMPOSITION FOR ELECTROCHEMICAL CELL COMPONENTS AND METHODS OF MAKING THEREOF

(75) Inventors: Bruce B. Fitts, Danielson, CT (US); Vincent R. Landi, Danielson, CT (US); Saroj Kumar Roy, Danielson, CT (US)

(73) Assignee: World Properties, Inc., Lincolnwood, IL (US)

( * ) Notice: Subject to any disclaimer, the term of this patent is extended or adjusted under 35 U.S.C. 154(b) by 372 days.

(21) Appl. No.: 09/929,517

(22) Filed: Aug. 14, 2001

(65) Prior Publication Data

US 2002/0037448 A1 Mar. 28, 2002

Related U.S. Application Data

(60) Provisional application No. 60/225,158, filed on Aug. 14, 2000, and provisional application No. 60/264,150, filed on Jan. 25, 2001.

(51) Int. Cl.[7] .............................................. H01M 2/14
(52) U.S. Cl. .......................... 429/38; 429/39; 429/32; 429/34; 252/511; 252/502; 252/503; 252/506; 252/508; 252/512; 252/513; 252/514; 252/515
(58) Field of Search ............................... 429/32, 34, 38, 429/39; 252/511, 502, 503, 506, 508, 512, 513, 514, 515

(56) References Cited

U.S. PATENT DOCUMENTS

| | | | |
|---|---|---|---|
| 3,012,086 A | 12/1961 | Vahldieck | 136/86 |
| 3,134,696 A | 5/1964 | Douglas et al. | 136/86 |
| 3,134,697 A | 5/1964 | Niedrach | 136/86 |
| 3,188,242 A | 6/1965 | Kordesch et al. | 136/86 |
| 3,497,389 A | 2/1970 | Berger et al. | 136/86 |
| 4,098,967 A | 7/1978 | Biddick et al. | 429/210 |
| 4,175,165 A | 11/1979 | Adlhart | 429/30 |
| 4,265,727 A | 5/1981 | Beckley | 204/242 |
| 4,545,926 A * | 10/1985 | Fouts et al. | 252/511 |
| 4,565,684 A | 1/1986 | Tibbetts et al. | 423/447.3 |
| 4,572,813 A | 2/1986 | Arakawa | 264/29.2 |
| 4,575,432 A | 3/1986 | Lin et al. | 252/511 |
| 4,610,808 A | 9/1986 | Kleiner | 252/512 |
| 4,663,230 A | 5/1987 | Tennent | 428/367 |
| 4,824,871 A | 4/1989 | Shinomura | 521/53 |
| 4,885,457 A | 12/1989 | Au | 219/548 |
| 4,938,833 A | 7/1990 | Kaufman et al. | 156/309.6 |
| 4,988,583 A | 1/1991 | Watkins et al. | 429/30 |
| 5,024,818 A | 6/1991 | Tibbetts et al. | 422/158 |
| 5,165,909 A | 11/1992 | Tennent et al. | 423/447.3 |
| 5,183,594 A | 2/1993 | Yoshinaka et al. | 252/518 |
| 5,194,307 A | 3/1993 | Gardeski | 428/40 |
| 5,223,568 A | 6/1993 | Landi et al. | 524/571 |
| 5,272,017 A | 12/1993 | Swathirajan et al. | 429/33 |
| 5,352,289 A | 10/1994 | Weaver et al. | 106/476 |
| 5,468,574 A | 11/1995 | Ehrenberg et al. | 429/33 |
| 5,475,048 A | 12/1995 | Jamison et al. | 524/439 |
| 5,521,018 A | 5/1996 | Wilkinson et al. | 42/26 |
| 5,565,072 A | 10/1996 | Faita et al. | 204/256 |
| 5,578,388 A | 11/1996 | Faita et al. | 429/30 |
| 5,591,382 A | 1/1997 | Nahass et al. | 252/511 |
| 5,591,832 A | 1/1997 | Koshijima et al. | 530/500 |

(List continued on next page.)

FOREIGN PATENT DOCUMENTS

| | | |
|---|---|---|
| EP | 0109824 | 5/1984 |
| EP | 0297888 | 1/1989 |
| EP | 0 975 039 A2 | 1/2000 |
| EP | 1 035 608 A2 | 9/2000 |
| EP | 1 107 340 A2 | 6/2001 |
| EP | 1 227 531 A1 | 7/2002 |
| GB | 1264741 | 2/1972 |
| GB | 2 359 186 A | 8/2001 |
| GB | 2 539 186 A | 8/2001 |
| JP | 61296067 | 12/1986 |
| JP | 62138549 | 6/1987 |
| JP | 2000077079 | 3/2000 |
| WO | WO 98/20572 | 5/1998 |
| WO | WO 99/04929 | 2/1999 |
| WO | WO 99/57949 | 11/1999 |
| WO | WO 99/67845 | 12/1999 |
| WO | WO 00/63303 | 10/2000 |
| WO | WO 01/18895 A1 | 3/2001 |
| WO | WO 03/009408 A1 | 1/2003 |

OTHER PUBLICATIONS

Derwent Publications Abstract XP002210989 & JP 62 138549A (Dec. 26, 1986).

Derwent Publications Abstract XP002210990 & JP 61 296067A (Dec. 26, 1986).

Patent Abstracts of Japan (Sep. 22, 2000) & JP 2000 077079A.

International Search Report mailed Oct. 9, 2002.

International Search Report dated Mar. 15, 2004 – International Application No. PCT/US02/19875, International Filing Date Jan. 18, 2002.

*Primary Examiner*—Bruce F. Bell
(74) *Attorney, Agent, or Firm*—Cantor Colburn LLP

(57) ABSTRACT

A conductive, moldable composite material for the manufacture of electrochemical cell components comprising a thermosetting resin system and conductive filler wherein the thermosetting resin composition comprises: (1) a polybutadiene or polyisoprene resin; (2) an optional functionalized liquid polybutadiene or polyisoprene resin; (3) an optional butadiene- or isoprene-containing copolymer; and (4) an optional low molecular weight polymer. In a preferred embodiment, the conductive moldable composite material is used to form a bipolar plate, current collector or other electrochemical cell component. Articles made of the conductive moldable composite material are resistant to chemical attack and hydrolysis, have excellent mechanical strength and toughness, have a volume resistivity of about 0.116 ohm-cm or less and preferably about 0.04 ohm-cm or less and a thermal conductivity of at least about 5 watts/meter ° K.

113 Claims, No Drawings

U.S. PATENT DOCUMENTS

| | | | |
|---|---|---|---|
| 5,629,098 A | 5/1997 | Poutasse et al. .............. 428/626 |
| 5,677,074 A | 10/1997 | Serpico et al. ................. 429/43 |
| 5,679,482 A | 10/1997 | Ehrenberg et al. ........... 429/249 |
| 5,709,957 A | 1/1998 | Chiang et al. ............... 428/615 |
| 5,728,283 A | 3/1998 | Reuter et al. ................ 204/499 |
| 5,750,197 A | 5/1998 | van Ooij et al. ............. 427/318 |
| 5,798,188 A | 8/1998 | Mukohyama et al. .......... 429/34 |
| 5,830,326 A | 11/1998 | Iijima ......................... 204/173 |
| 5,904,797 A | 5/1999 | Kwei ...................... 156/307.3 |
| 5,952,118 A | 9/1999 | Ledjeff et al. ................. 429/32 |
| 6,103,413 A | 8/2000 | Hinton et al. .................. 429/32 |
| 6,132,851 A | 10/2000 | Poutasse ..................... 428/209 |
| 6,146,780 A | 11/2000 | Cisar et al. .................... 429/34 |
| 6,183,714 B1 | 2/2001 | Smalley et al. .......... 423/447.3 |
| 6,248,467 B1 | 6/2001 | Wilson et al. ................. 429/39 |
| 6,251,308 B1 | 6/2001 | Butler ........................ 252/511 |
| 6,261,710 B1 | 7/2001 | Marianowski ............... 429/34 |
| 6,281,275 B1 | 8/2001 | Sanduja et al. ............. 524/401 |
| 6,372,376 B1 | 4/2002 | Fronk et al. ................... 429/41 |
| 2002/0001743 A1 | 1/2002 | Davis .......................... 429/34 |

* cited by examiner

THERMOSETTING COMPOSITION FOR ELECTROCHEMICAL CELL COMPONENTS AND METHODS OF MAKING THEREOF

CROSS-REFERENCE TO RELATED APPLICATIONS

This application claims priority to U.S. Provisional Application Ser. No. 60/225,158 filed on Aug. 14, 2000 and U.S. Provisional Application Ser. No. 60/264,150 filed on Jan. 25, 2001, both of which are incorporated herein by reference in their entirety.

BACKGROUND OF THE INVENTION

This invention relates to conductive materials, and in particular to conductive thermosetting compositions which find particular utility in the manufacture of electrochemical cell components, and methods of making thereof.

Conductive, moldable composite materials are actively being sought for use in electrochemical cells, which includes both electrolysis cells and fuel cells. A preferred type of electrochemical cell is the "proton exchange membrane" cell, wherein the cathode of the cell is separated from the anode by a proton exchange membrane that facilitates the diffusion of ions and/or water between the cathode and anode.

The typical electrochemical cell includes a number of individual cells arranged in a stack, with the working fluid directed through the cells via input and output conduits formed within the stack structure. The cells within the stack are sequentially arranged, each including a cathode, a proton exchange membrane, and an anode.

Membrane electrode assemblies ("MEAs") for use in fuel cells are well known, being described for example in U.S. Pat. Nos. 5,272,017 and 3,134,697, which are incorporated by reference herein. The MEA for each cell is placed between a pair of electrically conductive elements which serve as current collectors for the anode/cathode, and which generally contain an array of grooves in the faces thereof for distributing the gaseous reactants ($H_2$ and $O_2$/air) over the surfaces of the anode and cathode. The gaseous $O_2$/air reactant is usually saturated, typically with water.

Electrochemical cell systems generally comprise a plurality of such cells, which are stacked together in electrical series separated from each other by an impermeable, electrically conductive plate referred to as a bipolar plate. The bipolar plate thus serves as an electrically conductive separator element between two adjacent cells, and generally also has reactant gas distributing grooves on both external faces thereof. In most cases the bipolar plate also has internal passages through which coolant flows to remove heat from the stack. In the electrochemical cell environment, the exterior faces of the bipolar plates are in constant contact with often highly corrosive, acidic solutions at elevated temperatures. Moreover, at least one of the electrode faces may be polarized in the presence of pressurized, saturated air or hydrogen. To survive in such an environment, the bipolar plates must be able to withstand these pressures and be highly resistant to corrosion and degradation.

Bipolar plates are often fabricated from graphite, which is lightweight, corrosion resistant, and electrically conductive. However, graphite is quite brittle and thus prone to cracking, and mechanically difficult to handle, thus increasing production costs. Additionally, graphite is porous, making it virtually impossible to make the very thin, gas-impervious plates that are desirable for low-weight, low-volume electrochemical cell stacks. The graphite plates must also be operably connected to the other components by seal rings. Typically the seal ring material contains plasticizers and additives that leach out over time and contaminate the catalyst, which generally halts energy production.

PCT Application 99/19389 to Choate et al., U.S. Pat. No. 6,248,467 to Wilson et al., and U.S. Pat. No. 6,251,308 to Butler disclose molding compositions with conductive fillers that can be formed into structures exhibiting electrical and thermal conductivity such as bipolar plates. The molding compositions typically employ a low viscosity resin system, specifically epoxy, epoxy vinyl ester, and phenolic resin systems. While these compositions may offer some improvements to electrochemical cell technology, they may not have sufficient long-term chemical resistance. Materials employed in the electrochemical cell must be resistant to degradation in a particularly punishing environment over periods of time measured in years.

Accordingly, there is a perceived need in the art for a low cost, conductive molding composition with a high chemical resistance for use in electrochemical cells and methods of making thereof.

BRIEF SUMMARY OF THE INVENTION

The above described drawbacks and deficiencies are overcome by a conductive, moldable composite material for the manufacture of electrochemical cell components, comprising a thermosetting resin system and conductive filler, wherein the thermosetting resin composition comprises: (1) a polybutadiene or polyisoprene resin; (2) an optional, functionalized liquid polybutadiene or polyisoprene resin; (3) an optional butadiene- or isoprene-containing copolymer; and (4) an optional low molecular weight polymer. In a preferred embodiment, the conductive moldable composite material is used to form a bipolar plate, current collector or other electrochemical cell component. In another embodiment, articles made of the conductive, moldable composite material are resistant to chemical attack and hydrolysis, have excellent mechanical strength and toughness, have a volume resistivity of about 0.116 ohm-cm or less, and have a thermal conductivity of at least about 5 watts/meter ° K. (W/m ° K.). Articles have a linear shrinkage per unit length of the molded composite in the X-Y plane less than or equal to about 0.005, measured as described in ASTM D-955. In addition, the conductive, moldable composite material as well as articles made from it are economical to produce due to the inexpensive starting materials as well as the use of conventional processing equipment.

The above discussed and other features and advantages of the present invention will be appreciated and understood by those skilled in the art from the following detailed description.

DETAILED DESCRIPTION OF THE PREFERRED EMBODIMENTS

A conductive, moldable composite material for the manufacture of electrochemical cell components comprises a thermosetting resin system and conductive filler wherein the thermosetting resin composition comprises: (1) a polybutadiene or polyisoprene resin; (2) an optional, functionalized liquid polybutadiene or polyisoprene resin; (3) an optional butadiene- or isoprene-containing polymer; and (4) an optional, low molecular weight polymer. In a preferred embodiment, the conductive moldable composite material is used to form a bipolar plate, current collector or other electrochemical cell component.

The resin system used to form the conductive, moldable composite material is a thermosetting composition generally comprising a polybutadiene resin, polyisoprene resin or mixture thereof. The polybutadiene or polyisoprene resins may be liquid or solid at room temperature. Liquid resins may have a molecular weight greater than 5,000, but preferably have a molecular weight of less than 5,000 (most preferably between 1,000 and 3,000). The preferably liquid (at room temperature) resin portion maintains the viscosity of the composition at a manageable level during processing to facilitate handling, and it also crosslinks during cure. Polybutadiene and polyisoprene resins having at least 90% 1,2-addition by weight are preferred because they exhibit the greatest crosslink density upon cure owing to the large number of pendant vinyl groups available for crosslinking. High crosslink densities are desirable because the products exhibit superior performance in an electrochemical cell environment at elevated temperatures. A preferred resin is B3000 resin, a low molecular weight polybutadiene liquid resin having greater than 90 weight percent (wt. %) 1,2-addition. B3000 resin is commercially available from Nippon Soda Co., Ltd.

The resin system used to form the conductive, moldable composite optionally comprises functionalized liquid polybutadiene or polyisoprene resins. Examples of appropriate functionalities for butadiene liquid resins include but are not limited to epoxy, maleate, hydroxy, carboxyl and methacrylate. Examples of useful liquid butadiene copolymers are butadiene-co-styrene and butadiene-co-acrylonitrile. Possible functionalized liquid polybutadiene resins include Nisso G-1000, G-2000, G-3000; Nisso C-1000; Nisso BN-1010, BN-2010, BN-3010, CN-1010; Nisso TE-2000; and Nisso BF-1000 commercially available from Nippon Soda Co., Ltd. and Ricon 131/MA commercially available from Colorado Chemical Specialties, Inc.

The optional, butadiene- or isoprene-containing polymer is preferably unsaturated and can be liquid or solid. It is preferably a solid, thermoplastic elastomer comprising a linear or graft-type block copolymer having a polybutadiene or polyisoprene block, and a thermoplastic block that preferably is styrene or α-methyl styrene. Possible block copolymers, e.g., styrene-butadiene-styrene tri-block copolymers, include Vector 8508M (commercially available from Dexco Polymers, Houston, Tex.), Sol-T-6302 (commercially available from Enichem Elastomers American, Houston, Tex.), and Finaprene 401 (commercially available from Fina Oil and Chemical Company, Dallas, Tex.). Preferably, the copolymer is a styrene-butadiene di-block copolymer, such as Kraton D1118X (commercially available from Shell Chemical Corporation). Kraton D1118X is a di-block styrene-butadiene copolymer containing 30 vol % styrene.

The butadiene- or isoprene-containing polymer may also contain a second block copolymer similar to the first except that the polybutadiene or polyisoprene block is hydrogenated, thereby forming a polyethylene block (in the case of polybutadiene) or an ethylene-propylene copolymer (in the case of polyisoprene). When used in conjunction with the first copolymer, materials with enhanced toughness can be produced. Where it is desired to use this second block copolymer, a preferred material is Kraton GX1855 (commercially available from Shell Chemical Corp.), which is believed to be a mixture of styrene-high 1,2 butadiene-styrene block copolymer and styrene-(ethylene-propylene)-styrene block copolymer.

Thus, in a preferred embodiment, the butadiene- or isoprene-containing polymer comprises a solid thermoplastic elastomer block copolymer having the formula $X_m(Y-X)_n$ (linear copolymer) or

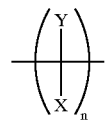

(graft copolymer), where Y is a polybutadiene or polyisoprene block, X is a thermoplastic block, and m and n represent the average block numbers in the copolymer, m is 0 or 1 and n is at least 1. The composition may further include a second thermoplastic elastomer block copolymer having the formula $W_p(Z-W)_q$ (linear copolymer) or

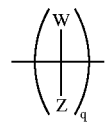

(graft copolymer) where Z is a polyethylene or ethylene-propylene copolymer block, W is a thermoplastic block, and p and q represent the average block numbers in the copolymer, p being 0 and 1 and q being at least 1.

The volume to volume ratio of the polybutadiene or polyisoprene resin to butadiene- or isoprene-containing polymer preferably is between 1:9 and 9:1, inclusive. The selection of the butadiene- or isoprene-containing polymer depends on chemical and hydrolysis resistance as well as the toughness conferred upon the molded material.

The optional low molecular weight polymer resin is generally employed to enhance toughness and other desired characteristics of composition. Examples of suitable low molecular weight polymer resins include, but are not limited to, telechelic polymers such as polystyrene, multifunctional acrylate monomers and ethylene propylene diene monomer (EPDM) containing varying amounts of pendant norbornene groups and/or unsaturated functional groups. The optional low molecular weight polymer resin can be present in amounts of about 0 to about 30 wt % of the resin composition.

Monomers with vinyl unsaturation, sometimes known as crosslinking agents, may also be included in the resin system for specific property or processing conditions, such as to decrease the viscosity of the conductive moldable composite material, especially with high filler loading. Viscosity is a key factor in obtaining acceptable molding rheologies. Inclusion of one or more monomers with vinyl unsaturation has the added benefit of increasing crosslink density upon cure. Suitable monomers must be capable of co-reacting with one of the other resin system components. Examples of suitable monomers include styrene, vinyl toluene, divinyl benzene, triallylcyanurate, diallylphthalate, and multifunctional acrylate monomers (such as Sartomer compounds available from Arco Specialty Chemicals Co.), among others, all of which are commercially available. The useful amount of monomers with vinyl unsaturation is about 0% by weight to about 80% by weight of the resin composition and preferably about 3% to about 50%.

A curing agent is preferably added to the resin system to accelerate the curing reaction. When the composition is heated, the curing agent decomposes to form free radicals, which then initiate cross linking of the polymeric chains. Preferred curing agents are organic peroxides such as Luperox, dicumyl peroxide, t-butyl perbenzoate, 2,5-dimethyl-2,5-di(t-butyl peroxy)hexane, α,α'-bis(t-butyl peroxy)diisopropylbenzene, and 2,5-dimethyl-2,5-di(t-butyl peroxy) hexyne-3, all of which are commercially available.

They may be used alone or in combination. Typical amounts of curing agent are from about 1.5 part per hundred parts of the total resin composition (PHR) to about 6 PHR.

Useful conductive fillers include metal fillers that do not leach, thus poisoning the catalyst, for example pure nickel (Ni), or 316 stainless steel. Carbonaceous conductive fillers are preferred due to their resistance to acid environments. Examples of carbonaceous fillers are carbon fibers, coke, natural and synthetic graphite powder, vapor grown carbon fibers, carbon nanotubes, carbon microtubes, carbon black, and chemically modified, e.g., coated carbon black with enhanced electrical properties. These fillers may be used alone or in combination. Combinations of filler may be desirable to maximize the packing density of the filler and thereby maximize the electrical conductivity of the molded composite.

Useful amounts of filler are about 10% to about 90% by volume of the total conductive molding composite material. Alternately useful amounts of filler are about 19.5 weight percent (wt %) to about 95.0 weight percent (wt %), preferably about 50 to about 95 wt %, more preferably about 80 to about 95 wt % based on the total weight of the conductive molding composite material. The fillers may have varying particle shapes, sizes and purities. Preferably some or all of the filler is in the form of fibers, microtubes, single wall or multi-wall graphite, single wall or multi-wall carbon nanotubes, platelets, or combinations comprising at least one of the foregoing filler forms. Fibers are herein defined as particles having a length to diameter ratio of at least about 2, preferably at least about 5 and more preferably at least about 100. Fibers having a length to diameter ratio of at least about 400 to about 10,000, which are known as high aspect ratio fillers, are preferred. Nanotubes and microtubes are exemplary high aspect ratio fillers. Platelets are herein defined as particles having two dimensions which are greater than a third dimension by at least a factor of two, preferably by greater than a factor of five. For example, the width and length are each at least two times greater than the height, or the diameter of a disk-shaped particle is at least two times greater than the height. Platelets may have regular or irregular geometries. Use of filler comprising fiber and/or platelets helps to decrease the amount of shrinkage of the composite material during cure. Particles wherein the longest single linear dimension is about 0.2 to 6000 micrometers may be used.

The conductive moldable composite material may further include various other additives for improving thermal conductivity, impact properties, mold-release properties, and thermo-oxidative stability. These additives are generally non-electrically conductive. Thermal conductivity can be improved with the addition of metal oxides, nitrides, carbonates or carbides (hereinafter sometimes referred to as "ceramic additives"). Such additives can be in the form of powders, flakes or fibers. Exemplary materials include oxides, carbides, carbonates, and nitrides of tin, zinc, copper, molybdenum, calcium, titanium, zirconium, boron, silicon, yttrium, aluminum or magnesium; mica; glass ceramic materials; or fused silica. When present, the thermally conducting materials are preferably present between about 60 to about 200 parts of thermally conducting material per 100 parts of total resin ("PHR"), and more preferably about 80 to about 180 PHR. The amounts of the above additives should not impair molding operations.

In general, the conductive molding composite material is processed as follows. First, all the components (the resin system, curing agent, filler and a volatile solvent when used) are thoroughly mixed in conventional mixing equipment. The mixing temperature is regulated to avoid substantial decomposition of the curing agent (and thus premature cure). Additionally, a small amount of an inhibitor, about 50 to about 350 parts per million by weight of resin, may be added to protect against peroxide decomposition. Mixing continues until the filler is uniformly dispersed through the resin. Additional solvent may be added to facilitate the formation of small particles.

The homogenized mixture is then removed, cooled and dried. If necessary the material may be deagglomerated by passing it through a coarse screen. Next, the particles are poured, pressed or injected into a mold, such as a compression, injection or transfer mold. Compression molding is preferred when some or all of the filler is in the form of fibers and/or platelets. Without being bound by theory, it is believed that the filler particles can become oriented during compression molding which reduces shrinkage of the composite material during cure. Alternatively, an extruder is used and the material is molded into the desired shape. The shaped article is cured in either a one or two step cure process.

In the two step cure process, the first step is a conventional peroxide cure step; typical cure temperatures are between about 150° C. and about 200° C. If the method used to form the conductive moldable composite material into the desired shape heats the article to a temperature between about 150° C. and about 200° C., then the forming step also constitutes the first cure step. Compression molding is one method of forming an article from the conductive moldable composite material which also functions as the first cure step. The second step of the cure process can either be a high temperature cure or high-energy electron beam irradiation cure (E-beam cure). A high temperature cure comprises heating the article to temperatures greater than about 230° C. but less than the decomposition temperature of the material, generally about 400° C. under an inert atmosphere.

E-beam curing is advantageous because it allows for controlled curing for a given system. The amount of curing (cross linking) is controlled by the total amount of radiation given to the article. The ability of the high-energy electrons to penetrate through the sample to specific depth is known as the penetration depth. The penetration depth is controlled by the E-beam source, and different sources give different penetration depths. The combined flexibility in the amount of curing as well as the depth of curing allows the production of articles with a range of physical dimensions, in particular thickness, as well as physical properties from the same conductive moldable composite material.

Articles made of the conductive moldable composite material are resistant to chemical attack and hydrolysis, and have excellent mechanical strength and toughness. The articles preferably have a volume resistivity of about 0.116 ohm-cm or less, preferably about 0.08 ohm-cm or less and most preferably about 0.045 ohm-cm or less.

The articles further possess a thermal conductivity of at least about 5 watts/meter ° K., preferably at least about 7 watts/meter ° K. and more preferably at least about 9 watts/meter ° K.

The linear shrinkage per unit length of the molded composite in the X-Y plane is less than or equal to about 0.005, preferably less than or equal to about 0.003, and most preferably less than or equal to about 0.001. Linear shrinkage per unit length of the molded composite is defined by ASTM D-955. Generally speaking it is the amount of shrinkage either in length (Y-direction) or width (X-direction) versus the corresponding original part dimension.

The method of the invention is further illustrated by the following examples which are meant to be illustrative, not limiting.

EXAMPLES

Examples 1–8

The conductive moldable composite materials of the following examples were made using the formulation and components in Table 1 with the type of graphite varied by example. The resulting properties and graphite types are shown in Table 2.

TABLE 1

| Component | Source, Trade Name | Vol. % |
|---|---|---|
| Liquid polybutadiene resin | Nisso B-3000 | 28.04 |
| Trimethylolpropane trimethacrylate | Sartomer SR-350 | 0.91 |
| t-Butyl perbenzoate | Triganox-C | 0.23 |
| Peroxide | Luprox 5OOR or Perkadox BC | 2.36 |
| Di-t-butyl-p-cresol | Ionol | 0.15 |
| Zinc stearate | — | 1.54 |
| Carbon fibers | Tenneco Avcarb 99 Type 401 | 14.60 |
| Synthetic graphite | Varied by example | 52.28 |

A dilute resin solution comprising up to about 50 parts by weight resin composition, preferably up to about 25 parts by weight resin composition and more preferably up to about 10 parts by weight resin composition and a volatile solvent, preferably acetone, was slowly added to the monomer, peroxides and inhibitor in a Ross double planetary mixer and mixed to produce a homogeneous solution. (Other volatile solvents may also be used.) Zinc stearate, a mold release agent, was then added and thoroughly mixed into the solution. The solution was added incrementally to the carbon fibers and graphite and mixed until all filler was completely dispersed. Another 100 parts by weight of acetone was added and the mixture was mixed for 15 minutes. The resulting particulate material was removed from the mixer and spread on screens and allowed to dry at room temperature. Residual solvent was removed in a drying oven at 120° C. The material was then passed through a coarse screen.

The material was molded into disks about 2 inches (50 mm) in diameter with a thickness of about 0.125 inch (3.18 mm) by compression molding at 180° C. for four minutes. The disks were further cured in an oven at 240° C. The disks were tested for resistivity according to IPC-TM-650, flex stress and flex modulus according to ASTM D-790-99, and thermal conductivity according to ASTM C-518. Values for flex stress are given in pounds per square inch (psi) and megapascals (MPa). Values for flex modulus are given in kilopounds per square inch (Kpsi) and megapascals (MPa).

TABLE 2

| Ex. | Graphite Type | Flex Stress (psi/Mpa) | Flex Modulus (Kpsi/Mpa) | Thermal Conductivity (W/m ° K.) | Volume Resistivity (ohm-cm) at 0.125 inch |
|---|---|---|---|---|---|
| 1 | Asbury APS | 2488/17.1 | 1316/9073 | 7 | 0.152 |
| 2 | Asbury 4012 | 2515/17.3 | 781/5384 | 6 | 0.100 |
| 3 | Asbury A99 | 3821/26.3 | 970/6687 | 16 | 0.0253 |
| 4 | Asbury A60 | 2325/16.0 | 830/5722 | 7 | 0.057 |
| 5 | Asbury A230U | 2970/20.5 | 902/6219 | 14 | 0.025 |
| 6 | Asbury 4957 | 1418/9.8 | 370/2551 | 17 | 0.0213 |
| 7 | Asbury 3610 | 1717/11.8 | 567/3909 | 9 | 0.0441 |
| 8 | Asbury 3621 | 1231/8.5 | 296/2040 | 12 | 0.0363 |

Example 1, when further comprising NZ33, a neoalkoxy zirconate produced by Kenrich Petrochemicals, Inc., as a coupling agent, has a maximum stress of 2366 psi (16.3 Mpa and a flex modulus of 1140 Kpsi (7862 Mpa).

Examples 1–8 employ various kinds of graphites. These graphites can be differentiated primarily on the basis of their origin, carbon content, particle size, and purity. Asbury APS is a synthetic graphite with a minimum carbon content of 95% and mean particle size of 35 micrometers. Asbury 4012 is a synthetic graphite with a minimum carbon content of 98% and a mean particle size of 140 micrometers, and Asbury A60 is a synthetic graphite with a minimum carbon content of 98% and a mean particle size of 65 micrometers. Asbury A99 is a synthetic graphite with a minimum carbon content of 98% and a mean particle size of 25 micrometers, and Asbury A230U is a natural graphite with a very high carbon content and a mean particle size of 20 micrometers. Asbury 4957 is a hybrid graphite with a minimum carbon content of 99% and a mean particle size of 44 micrometers. Asbury 3610 is a natural flake graphite with a minimum carbon content of 99.5% and a mean particle size of 75 micrometers. Asbury 3621 is also a natural graphite plate with minimum carbon content of 99.4% and a mean particle size of 300 micrometers.

Examples 9–14

The conductive moldable composite materials of the following examples were made using the formulation and components in Table 3 with the type of filler varied by example. The filler types and resulting properties are shown in Table 4 and Table 5.

TABLE 3

| Component | Source, Trade Name | Vol. % |
|---|---|---|
| Liquid polybutadiene resin | Nisso B-3000 | 28.04 |
| Trimethylolpropane trimethacrylate | Sartomer SR-350 | 0.91 |
| t-butyl perbenzoate | Triganox-C | 0.23 |
| Peroxide | Luprox 5OOR or Perkadox BC | 2.36 |
| di-t-butyl-p-cresol | Ionol | 0.15 |
| Zinc stearate | — | 1.54 |

A dilute resin solution comprising up to about 50 parts by weight resin, preferably up to about 25 parts by weight resin and more preferably up to about 10 parts by weight resin and a volatile solvent, preferably acetone, is slowly added to the monomer, peroxides and inhibitor in a Ross double planetary mixer and mixed to produce a homogeneous solution. Zinc stearate, a mold release agent, is then added and thoroughly mixed into the solution. The solution is added incrementally to the filler and mixed until all filler is completely dispersed. Another 100 parts by weight of acetone is added and the mixture is mixed for 15 minutes. The resulting particulate material is removed from the mixer and spread on screens and allowed to dry at room temperature. Residual solvent is removed in a drying oven at 120° C. The material is then passed through a coarse screen.

The material was molded into rectangles about 4.21 inches (107 mm) long, 1.76 inches (44.7 mm) wide and 0.2 inches (5 mm) thick by compression molding at 180° C. for four minutes. The rectangles were further cured in an oven at 240° C. The rectangles were checked for shrinkage using ASTM D-955 in the X and Y directions (width and length) and the coefficient of thermal expansion (CTE) was determined at a temperature range from 30° C. to 145° C. in both the X and Y directions according to ASTM D-696. Shrinkage is reported as linear shrinkage per unit length of the molded composite.

TABLE 4

| Ex. | Filler Type | Linear shrinkage per unit length of the molded composite | | CTE (micrometers/meter °C.) | |
|---|---|---|---|---|---|
| | | Length | Width | X | Y |
| 9* | 84 wt % Asbury A99 | 0.00653 | 0.00670 | 15.0 | 14.7 |
| 10 | 15 wt % Avcarb Carbon Fiber 69 wt % Asbury 230U | 0.00119 | 0.00187 | 11.6 | 9.44 |
| 11 | 30 wt % Avcarb Carbon Fiber 54 wt % Asbury 230U | 0.00085 | 0.00125 | 3.45 | 5.32 |
| 12 | 10 wt % Zoltek Panex P33 Carbon Fiber 74 wt % Asbury A99 | 0.00335 | 0.00335 | 10.4 | 10.3 |
| 13 | 15 wt % Zoltek Panex P33 Carbon Fiber 69 wt % Asbury A99 | 0.00154 | 0.00210 | 9.34 | 9.6 |
| 14 | 50 wt % Asbury 3621 34 wt % Asbury A99 | 0.00069 | 0.00085 | 4.64 | 5.58 |

*Example 9 is a control example that contains no fiber or platelets.

TABLE 5

| Ex. | Filler | Flex Stress (psi/Mpa) | Flex Modulus (Kpsi/Mpa) | Thermal Conductivity (W/m ° K.) | Volume Resistivity (ohm-cm) at 0.125 inch |
|---|---|---|---|---|---|
| 9* | 84 wt % Asbury A99 | 3821/26.35 | 970/6689 | 16.0 | 0.0253 |
| 10 | 15 wt % Avcarb Carbon Fiber 69 wt % Asbury 230U | 3239/27.33 | 1003/6917 | 9.89 | 0.0321 |
| 11 | 30 wt % Avcarb Carbon Fiber 54 wt % Asbury 230U | 3700/25.52 | 1052/7255 | 7.125 | 0.0338 |
| 12 | 10 wt % Zoltek Panex P33 Carbon Fiber 74 wt % Asbury A99 | 2784/19.2 | 627/4324 | 11.46 | 0.0254 |
| 13 | 15 wt % Zoltek Panex P33 Carbon Fiber 69 wt % Asbury A99 | 3576/24.4 | 852/5876 | 9.16 | 0.0276 |
| 14 | 50 wt % Asbury 3621 34 wt % Asbury A99 | — | — | 10.55 | 0.026 |

*Example 9 contains no fiber or platelets.

The comparison of the results of Examples 10–14 with Example 9 demonstrates the value of fibrous and platelet fillers in the composite material. In Examples 10–14 the amount (weight percent based on the total weight of the composite material) of filler is kept constant at 84 wt % while the composition of the filler is varied. In Example 9 Asbury A99 is used exclusively.

The conductive moldable composite material as well as articles made from it are economical to produce due to the inexpensive starting materials as well as the use of conventional processing equipment.

While preferred embodiments have been shown and described, various modifications and substitutions may be made thereto without departing from the spirit and scope of the invention. Accordingly, it is to be understood that the present invention has been described by way of illustration and not limitations.

What is claimed is:

1. A composite material for the manufacture of electrochemical cell components comprising:
    a thermosetting resin system and a conductive filler wherein the thermosetting resin system comprise a polybutadiene or polyisoprene resin and an unsaturated butadiene- or isoprene-containing polymer, and the composite material has a volume resistivity of about 0.116 ohm-cm or less.

2. The composite material of claim 1, wherein a volume to volume ratio of the polybutadiene or polyisoprene resin to the unsaturated butadiene- or isoprene-containing polymer is between 1:9 and 9:1, inclusive.

3. The composite material of claim 1, wherein the unsaturated butadiene- or isoprene-containing polymer is a copolymer of isoprene or butadiene and a second monomer.

4. The composite material of claim 1, wherein the unsaturated butadiene- or isoprene-containing polymer is a di-block copolymer.

5. The composite material of claim 4 wherein the unsaturated butadiene- or isoprene-containing polymer is a styrene-butadiene or α-methyl styrene-butadiene di-block copolymer.

6. The composite material of claim 3 wherein the unsaturated butadiene- or isoprene-containing polymer is a thermoplastic elastomer block copolymer having one of the formula

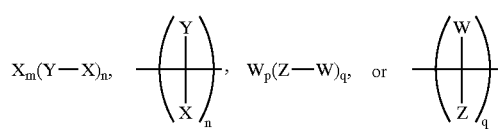

where in each formula Y is a block comprising isoprene or butadiene units, X is a thermoplastic block, and m and n represent the average block numbers in said copolymer, m being 0 or 1 and n being at least 1; and Z is a polyethylene or ethylene-propylene copolymer block, W is a thermoplastic block, and p and q represent the average block numbers in said copolymer, p being 0 or 1 and q being at least 1.

7. The composite material of claim 1, wherein the unsaturated butadiene- or isoprene-containing copolymer is liquid.

8. The composite material of claim 1, wherein the unsaturated butadiene- or isoprene-containing copolymer is solid.

9. The composite material of claim 1 wherein the conductive filler is synthetic graphite.

10. The composite material of claim 1 further comprising a curing agent.

11. The composite material of claim 10 wherein the curing agent is an organic peroxide.

12. The composite material of claim 11 wherein the curing agent is selected from the group consisting of dicumyl peroxide, di(2-tert-butylperoxyisopropyl) benzene, t-butylperbenzoate, 2,5-dimethyl-2,5-di(t-butyl peroxy) hexyne-3, and combination, thereof.

13. The composite material of claim 1 wherein the polybutadiene or polyisoprene resin is liquid and has a molecular weight of less than 5,000.

14. The composite material of claim 1 wherein the polybutadiene or polyisoprene resin is liquid and has a molecular weight of about 1,000 to about 3,000.

15. The composite material of claim 1 further comprising a functionalized liquid polybutadiene or polyisoprene resin.

16. The composite material of claim 1 further comprising a low molecular weight polymer resin.

17. The composite material of claim 1 further comprising at least one crosslinking monomer with vinyl unsaturation.

18. The composite material of claim 17 wherein the at least one monomer with vinyl unsaturation is selected from the group consisting of styrene, vinyl toluene, divinyl benzene, triallylcyanurate, diallylphthalate, and multifunctional acrylate monomers.

19. The composite material of claim 1, wherein the composite material comprises, based on the total material, about 10 to about 90 volume percent of the conductive filler.

20. The composite material of claim 1, wherein all or part of the conductive filler is in the form of fibers, platelets, or a combination of fibers and platelets.

21. The composite material of claim 1, wherein the composite material has a volume resistivity of about 0.08 ohm-cm or less.

22. The composite material of claim 21 wherein the composite material has a volume resistivity of about 0.04 ohm-cm or less.

23. The composite material of claim 1, wherein the composite material has a thermal conductivity of at least about 5 watts/meter ° K.

24. The composite material of claim 23, wherein the composite material has a thermal conductivity of at least about 7 watts/meter ° K.

25. The composite material of claim 24, wherein the composite material has a thermal conductivity of at least about 9 watts/meter ° K.

26. An article molded from the composite material of claim 1, wherein the article has a linear shrinkage per unit length of the molded composite in the X-Y plane of less than or equal to about 0.005.

27. The article of claim 26, wherein the linear shrinkage per unit length of the molded composite in the X-Y plane is less than or equal to about 0.003.

28. The article of claim 27, wherein the linear shrinkage per unit length of the molded composite in the X-Y plane is less than or equal to 0.001.

29. A bipolar plate formed from the composite material of claim 1.

30. A composite material for the manufacture of electrochemical cell components comprising:
a thermosetting resin system and about 10 vol % to about 90 vol % of conductive filler, based on the total volume of the composite material, wherein the thermosetting resin composition comprises a liquid polybutadiene or polyisoprene resin having a molecular weight of less than about 5,000, and wherein the composite material has a thermal conductivity of a least about 5 watts/meter ° K. and volume resistivity of about 0.116 ohm-cm or less.

31. A method of making a composite material for the manufacture of electrochemical cell components comprising:
making a dilute solution of a thermosetting resin system comprising polybutadiene or polyisoprene resin in a volatile solvent;
slowly adding the dilute solution to a conductive filler; and mixing to form a homogeneous solution.

32. The method of claim 31 wherein the thermosetting resin system further comprises an unsaturated butadiene- or isoprene-containing polymer capable of participating in cross-linking with the polybutadiene or polyisoprene resin during cure, and further wherein a volume to volume ratio of the polybutadiene or polyisoprene resin to the unsaturated butadiene- or isoprene-containing polymer is between 1:9 and 9:1, inclusive.

33. The method of claim 32 wherein the unsaturated butadiene- or isoprene-containing polymer is a copolymer of isoprene or butadiene and a second monomer.

34. The method of claim 33 wherein the unsaturated butadiene- or isoprene-containing polymer is a di-block copolymer.

35. The method of claim 34 wherein the unsaturated butadiene- or isoprene-containing polymer is a styrene-butadiene or α-methyl styrene-butadiene di-block copolymer.

36. The method of claim 33 wherein the unsaturated butadiene- or isoprene-containing polymer is a thermoplastic elastomer block copolymer having one of the formula

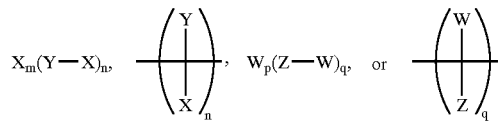

wherein each formula Y is a block comprising isoprene or butadiene units, X is a thermoplastic block, and m and n represent the average block numbers in said copolymer, m being 0 or 1 and n being at least 1; and Z is a polyethylene or ethylene-propylene copolymer block, W is a thermoplastic block, and p and q represent the average block numbers in said copolymer, p being 0 or 1 and being at least 1.

37. The method of claim 32 wherein the unsaturated butadiene- or isoprene-containing polymer is liquid.

38. The method of claim 32 wherein the unsaturated butadiene- or isoprene-containing copolymer is a solid.

39. The method of claim 31 wherein the conductive filler is synthetic graphite.

40. The method of claim 31 wherein the thermosetting resin system further comprises a curing agent.

41. The method of claim 40 wherein the curing agent is an organic peroxide.

42. The method of claim 41 wherein the curing agent is selected from the group consisting of dicumyl peroxide, di(2-tert-butylperoxyisopropyl) benzene, t-butylperbenzoate, 2,5-dimethyl-2,5-di(t-butyl peroxy) hexyne-3, and combinations thereof.

43. The method of claim 31 wherein the polybutadiene or polyisoprene resin has a molecular weight of less than 5,000.

44. The method of claim 31 wherein the polybutadiene or polyisoprene resin has a molecular weight of about 1,000 to about 3,000.

45. The method of claim 31 wherein the thermosetting resin system further comprises a functionalized liquid polybutadiene or polyisoprene resin.

46. The method of claim 31 wherein the thermosetting resin system further comprises at lest one crosslinking monomer with vinyl unsaturation.

47. The method of claim 46 whrein the at least one monomer with vinyl unsaturation is selected from the group consisting of styrene, vinyl toluene, divinyl butene, triallylcyanurate, diallylphthalate, and multifunctional acrylate monomers.

48. The method of claim 31, wherein the composite material comprises, based on the total material, about 10 vol % to about 90 vol % of the conductive filler.

49. A conductive composite material comprising, based on the total volume of the material,
a, thermosetting resin system and about 10 to about 90 volume percent of a conductive filler, wherein the thermosetting resin system comprises a polybutadiene or polyisoprene resin and the conductive composite material is formed into an electrochemical cell component having a volume resistivity of about 0.116 ohm-cm or less, a thermal conductivity of at least about 5 watts/meter ° K. and a linear shrinkage per unit length of the molded composite in the X-Y plane of less or equal to about 0.005.

50. A conductive composite material comprising
a thermosetting resin system and about 10 to about 90 volume percent of a conductive filler, based on the total volume of the composite, wherein the thermosetting resin system comprise a liquid polybutadiene or polyisoprene resin having a molecular weight of less than about 5,000, and further wherein the composite material is formed into an electrochemical cell component having a volume resistivity of 0.116 ohm-cm or loss and a linear shrinkage per unit length of the molded composite in the X-Y plane of less than or equal to about 0.005.

51. A composite material for the manufacture of electrochemical cell components comprising:
a thermosetting resin system, a conductive filler, and a curing agent comprising an organic peroxide, wherein the thermosetting resin system comprises a polybutadiene or polyisoprene resin, wherein the composite material comprises, based on the total volume of the material, about 10 to about 90 volume percent of the conductive filler, and wherein the composite material has a volume resistivity of about 0.116 ohm-cm or less.

52. The composite material of claim 51, further comprising an unsaturated butadiene- or isoprene containing polymer, wherein a volume to volume ratio of the polybutadiene or polyisoprene resin to the unsaturated butadiene- or isoprene-containing polymer is between 1:9 and 9:1, inclusive.

53. The composite material of claim 52, wherein the unsaturated butadiene- or isoprene-containing polymer is a styrene-butadiene or α-methyl styrene-butadiene di-block copolymer.

54. The composite material of claim 51, wherein the conductive filler is synthetic graphite.

55. The composite material of claim 51, wherein the curing agent is selected from the group consisting of dicumyl peroxide, di(2-tert-butylperoxyisopropyl) benzene, t-butylperbenzoate, 2,5-dimethyl-2,5-di(t-butyl poroxy) hexyne-3, and combinations thereof.

56. The composite material of claim 51, wherein the polybutadiene or polyisoprene resin is liquid and has a molecular weight of less than 5,000.

57. The composite material of claim 51, wherein the polybutadiene or polyisoprene resin is liquid and has a molecular weight of about 1,000 to about 3,000.

58. The composite material of claim 51, further comprising a functionalized liquid polybutadiene or polyisoprene resin and/or a low molecular weight polymer resin and/or a crosslinking monomer with vinyl unsaturation.

59. The composite material of claim 51, wherein the composite material has a thermal conductivity of at least about 5 watts/meter ° K.

60. The composite material of claim 51, wherein the composite material has a volume resistivity of about 0.08 ohm-cm or loss and a thermal conductivity of at least about 7 watts/meter ° K.

61. The composite material of claim 51, wherein the composite material has a volume resistivity of about 0.04 ohm-cm or less and thermal conductivity of at least about 9 watts/meter ° K.

62. An article molded from the composite material of claim 51, wherein the article has a linear shrinkage per unit length of the molded composite in the X-Y plane of less than or equal to about 0.005.

63. The article of claim 62, wherein the linear shrinkage per unit length of the molded composite in the X-Y plane is loss than or equal to about 0.003.

64. The article of claim 62, wherein the linear shrinkage per unit length of the molded composite in the X-Y plane is loss than or equal to 0.001.

65. A bipolar plate formed from the composition of claim 51.

66. A composite material for the manufacture of electrochemical cell components comprising:
a thermosetting resin system and 10 to 90 volume percent off a conductive filler, based on the total volume of the composite material, wherein the resin system comprises a polybutadiene or polyisoprene resin and a conductive filler, and wherein the composite material has a thermal conductivity of at least about 5 watts/meter ° K. and a volume resistivity of about 0.116 ohm-cm or less.

67. The composite material of claim 66, further comprising an unsaturated butadiene- or isoprene-containing polymer, wherein a volume to volume ratio of the polybutadiene or polyisoprene resin to the unsaturated butadiene- or isoprene-containing polymer is between 1:9 and 9:1, inclusive.

68. The composite material of claim 67, wherein the unsaturated butadiene- or isoprene-containing polymer is a styrene-butadiene or α-methyl styrene-butadiene di-block copolymer.

69. The composite material of claim 66, wherein the conductive filler is synthetic graphite.

70. The composite material of claim 66, further comprising an organic peroxide curing agent.

71. The composite material of claim 66, wherein the polybutadiene or polyisoprene resin is liquid and has a molecular weight of less than 5,000.

72. The composite material of claim 66, wherein the polybutadiene or polyisoprene resin is liquid and has a molecular weight of about 1,000 to about 3,000.

73. The composite material of claim 66, further comprising a functionalized liquid polybutadiene or polyisoprene resin and/or a low molecular weight polymer resin and/or a crosslinking monomer with vinyl unsaturation.

74. The composite material of claim 66, wherein the composite material has a volume resistivity of about 0.08 ohm-cm or less and a thermal conductivity of at least about 7watts/meter ° K.

75. The composite material of claim 66, wherein the composite material has a volume resistivity of about 0.04 ohm-cm or less and a thermal conductivity of at least about 9watts/meter ° K.

76. An article molded from the composite material of claim 66, wherein the article has a linear shrinkage per unit length of the molded composite in the X-Y plane of less than or equal to about 0.005.

77. The article of claim 76, wherein the linear shrinkage per unit length of the molded composite in the X-Y plane is less than or equal to about 0.003.

78. The article of claim 76, wherein the linear shrinkage per unit length of the molded composite in the X-Y plane is less than or equal to 0.001.

79. A bipolar plate formed from the composition of claim 66.

80. A composite material for the manufacture of electrochemical cell components comprising:

a thermosetting resin system and 10 to 90 volume precent of a conductive filler, based on the total volume of the composite material, wherein the thermosetting resin system comprises a polybutadiene or polyisoprene resin, wherein the composite material has a volume resistivity of about 0.116 ohm-cm or less, and wherein an article molded from the composite material has a linear shrinkage per unit length of the molded composite in the X-Y plane of less than or equal to about 0.005.

81. The composite material of claim 80, further comprising an unsaturated butadiene- or isoprene-containing polymer, wherein a volume to volume ratio of the polybutadiene or polyisoprene resin to the unsaturated butadiene- or isoprene-containing polymer is between 1:9 and 9:1, inclusive.

82. The composite material of claim 81, wherein the unsaturated butadiene- or isoprene-containing polymer is a styrene-butadiene or α-methyl styrene-butadiene di-block copolymer.

83. The composite material of claim 80, wherein the conductive filler is synthetic graphite.

84. The composite material of claim 80, wherein the polybutadiene or polyisoprene resin is liquid and has a molecular weight of less than 5,000.

85. The composite material of claim 80, further comprising an unsaturated butadiene- or isoprene-containing polymer, a low molecular weight polymer resin, and/or a crosslinking monomer with vinyl unsaturation.

86. The composite material of claim 80, wherein the composite material has a volume resistivity of about 0.08 ohm-cm or less and a thermal conductivity of at least about 5watts/meter ° K.

87. The composite material of claim 80, wherein the composite material has a volume resistivity of about 0.04 ohm-cm or less and a thermal conductivity of at least about 9watts/meter ° K.

88. The composite material of claim 80, wherein the linear shrinkage per unit length of the article in the X-Y plane is less than or equal to about 0.003.

89. The composite material of claim 80, wherein the linear shrinkage per unit length of the molded composite in the X-Y plane is less than or equal to 0.001.

90. A bipolar plate formed from the composite material of claim 80.

91. A composite material for the manufacture of electrochemical cell components comprising:
a thermosetting resin system and 10 to 90 volume percent of a conductive filler, based on the total volume of the composite material, wherein the thermosetting resin system comprises a liquid polybutadiene or polyisoprene resin having a molecular weight of less than about 5,000, and wherein the composite material has a volume resistivity of about 0.116 ohm-cm or less.

92. The composite material of claim 91, further comprising an unsaturated butadiene- or isoprene-containing polymer, wherein a volume to volume ratio of the polybutadiene or polyisoprene resin to the unsaturated butadiene- or isoprene-containing polymer is between 1:9 and 9:1, inclusive.

93. The composite material of claim 92, wherein the unsaturated butadiene- or isoprene-containing polymer is a styrene-butadiene or α-methyl styrene-butadiene di-black copolymer.

94. The composite material of claim 91, wherein the conductive filler is synthetic graphite.

95. The composite material of claim 91, further comprising an unsaturated butadiene- or isoprene-containing polymer, a low molecular weight polymer resin, and/or a crosslinking monomer with vinyl unsaturation.

96. The composite material of claim 91, wherein the composite material has a volume resistivity of about 0.08 ohm-cm or less and thermal conductivity of at least about 5 watts/meter ° K.

97. The composite material of claim 91, wherein the composite material has a volume resistivity of about 0.04 ohm-cm or less and a thermal conductivity of at least about 7 watts/meter ° K.

98. An article molded from the composite material of claim 91, wherein the article has a linear shrinkage per unit length of the molded composite in the X-Y plane of less than or equal to about 0.005.

99. The article of claim 98, wherein the linear shrinkage per unit length of the molded composite in the X-Y plane is less than or equal to about 0.003.

100. The article of claim 98, wherein the linear shrinkage per unit length of the molded composite in the X-Y plane is less than or equal to 0.001.

101. A bipolar plate formed from the composite material of claim 90.

102. A composite material for the manufacture of electrochemical cell components comprising:
a thermosetting resin system and about 10 to about 90 volume percent of a conductive filler, based on the total volume of the composite material, wherein the thermosetting resin system comprises a liquid polybutadiene or polyisoprene resin having a molecular weight of less than about 5,000, wherein the composite material has a thermal conductivity of at least about 5 watts/meter ° K. and a volume resistivity of about 0.116 ohm-cm or less and wherein an article molded from the composite material has a linear shrinkage per unit length of the molded composite in the X-Y plane of less than or equal to about 0.005.

103. The composite material of claim 102, further comprising an unsaturated butadiene- or isoprene-containing polymer, wherein a volume to volume ratio of the polybutadiene or polyisoprene resin to the unsaturated butadiene- or isoprene-containing polymer is between 1:9 and 9:1, inclusive.

104. The composite material of claim 103, wherein the unsaturated butadiene- or isoprene-containing polymer is a styrene-butadiene or α-methyl styrene-butadiene di-block copolymer.

105. The composite material of claim 102, wherein the conductive filler is synthetic graphite.

106. The composite material of claim 102, further comprising an organic peroxide curing agent.

107. The composite material of claim 102, wherein the polybutadiene or polyisoprene resin is liquid and has a molecular weight of about 1,000 to about 3,000.

108. The composite material of claim 102, further comprising a functionalized liquid polybutadiene or polyisoprene resin and/or a low molecular weight polymer resin and/or a crosslinking monomer with vinyl unsaturation.

109. The composite material of claim 102, wherein the composite material has a volume resistivity of about 0.08 ohm-cm or loss and a thermal conductivity of at least about 7 watts/meter ° K.

110. The composite material of claim 102, wherein the composite material has a volume resistivity of about 0.04 ohm-cm or less and thermal conductivity of at least about 9 watts/meter ° K.

111. The composite material of claim 102, wherein the linear shrinkage per unit length of the molded composite in the X-Y plane is less than or equal to about 0.003.

112. The composite material of claim 102, wherein the linear shrinkage per unit length of the molded composite in the X-Y plane is less than or equal to 0.00 1.

113. A bipolar plate formed from the composite of claim 102.

* * * * *